United States Patent [19]

Klingman

[11] Patent Number: 4,954,983
[45] Date of Patent: Sep. 4, 1990

[54] DATA DRIVER FOR MULTIPLE MODE BUFFERED PROCESSOR-PERIPHERAL DATA TRANSFER WITH SELECTIVE RETURN OF DATA TO PROCESSOR

[75] Inventor: Kayla R. Klingman, Portland, Oreg.

[73] Assignee: Tektronix, Inc., Beaverton, Oreg.

[21] Appl. No.: 107,203

[22] Filed: Oct. 13, 1987

[51] Int. Cl.⁵ .................. G06F 3/00; G06F 13/12; G06F 13/42
[52] U.S. Cl. .................. 364/900; 364/935.2; 364/935.4; 364/935; 364/939; 364/940
[58] Field of Search ... 364/200 MS File, 900 MS File; 341/95; 371/21.1, 21.2, 17, 18, 16, 20.5, 20.4

[56] References Cited

U.S. PATENT DOCUMENTS

| | | | |
|---|---|---|---|
| 4,057,847 | 11/1977 | Lowell | 371/18 |
| 4,200,224 | 4/1980 | Flint | 371/18 |
| 4,291,370 | 9/1981 | Charles | 364/200 |
| 4,296,469 | 10/1981 | Gunter | 364/200 |
| 4,309,754 | 1/1982 | Dinwiddie | 364/200 |
| 4,507,731 | 3/1985 | Morrison | 364/200 |
| 4,523,276 | 6/1985 | Maejima et al. | 341/95 |
| 4,527,236 | 7/1985 | Ermolovich | 364/200 |
| 4,553,201 | 11/1985 | Pollack | 371/17 |
| 4,575,814 | 3/1986 | Brooks, Jr. et al. | 364/900 |
| 4,593,267 | 6/1986 | Kuroda et al. | 364/900 |
| 4,623,874 | 11/1986 | Thoma | 341/95 |
| 4,628,446 | 12/1986 | Hoffner, II | 364/200 |
| 4,633,387 | 12/1986 | Hartung et al. | 364/200 |
| 4,633,437 | 12/1986 | Mothersole | 364/900 |
| 4,669,043 | 5/1987 | Kaplinsky | 364/200 |
| 4,672,570 | 6/1987 | Benken | 364/900 |
| 4,683,534 | 7/1987 | Tietjen et al. | 364/200 |
| 4,747,047 | 5/1988 | Coogan et al. | 364/200 |
| 4,788,683 | 11/1988 | Hester | 371/16.1 |
| 4,872,107 | 10/1989 | Marple | 364/200 |
| 4,878,168 | 10/1989 | Johnson | 371/21.1 |

Primary Examiner—Archie E. Williams, Jr.
Assistant Examiner—Eric Coleman
Attorney, Agent, or Firm—John P. Dellett

[57] ABSTRACT

A data transfer driver transfers multiple byte data words supplied by a data processing device to a peripheral device as a sequence of single data bytes. The driver operates selectively in either a handshaking mode, wherein data bytes are transferred to the peripheral device asynchronously in response to handshaking signals from the peripheral device, or in a streaming mode where data bytes are transferred to the peripheral device periodically. The driver includes circuitry that permits the data processing device to check the operation of the driver and to monitor handshaking signals produced by the peripheral device.

7 Claims, 5 Drawing Sheets

DATA DRIVER FOR MULTIPLE MODE BUFFERED PROCESSOR-PERIPHERAL DATA TRANSFER WITH SELECTIVE RETURN OF DATA TO PROCESSOR

BACKGROUND OF THE INVENTION

The present invention relates to drivers for transferring data between a computer and a peripheral device, and in particular to a data transfer driver that receives multiple byte data words from a computer and retransmits them as sequences of data bytes to a peripheral device.

Computers typically process data words having more than one 8-bit byte whereas many peripheral devices such as printers, modems and the like are able to receive data only one byte at a time. Thus in order for a computer to transmit, for example, a 32-bit data word to such a peripheral device, the computer must transmit each byte of the data word in sequence. Such an operation can require a large number of computer processing cycles, particularly when the computer is relatively fast, the peripheral device is relatively slow, and the computer and peripheral device communicate using asynchronous handshaking protocols.

Bi-directional asynchronous ports of a computer are typically connected to a peripheral device through a cable plugged into a cable connector mounted on the computer's chassis. In order to test the operation of an asynchronous port, the cable is disconnected from the cable connector and a test plug is plugged into the cable connector. The test plug cross-couples input and output data and control signal pins on the connector so that data transmitted by the computer out of the port is returned to the computer through the port in the opposite direction. Thus, the test plug enables the computer to test port operation by sending data to itself, but an operator must first physically replace the cable with the test plug. Therefore, such port test method cannot be performed automatically without operator intervention.

SUMMARY OF THE INVENTION

In accordance with one aspect of the invention, a parallel data transfer driver transfers data from a computer to a peripheral device. The data transfer driver includes a write buffer for receiving a parallel data word comprising a plurality of data bytes transmitted by the computer and for sequentially retransmitting each of the data bytes, one byte at a time, to the peripheral device. The driver also includes control circuitry to send and receive handshaking control signals to and from the computer and the peripheral device to control asynchronous data receipt and transmission by the write buffer. The data transfer driver frees the computer from having to transfer the data to the peripheral device one byte at a time so that while the data transfer driver is transmitting individual data bytes to the peripheral device, the computer may carry out other operations.

In accordance with another aspect of the invention, the data transfer driver further includes a read buffer that receives each data byte retransmitted by the write buffer to the peripheral device, as well as the handshaking control signals produced by the peripheral device. When requested to do so by signals from the computer, the control circuit output enables the read buffer. When output enabled, the read buffer transmits the data and handshaking control signals back to the computer. The read buffer enables the computer to automatically test functioning of the data transfer driver without human intervention. It also allows the computer to monitor the handshaking signals produced by the peripheral device to ensure that it is functioning properly.

In accordance with a further aspect of the invention, the data transfer driver may be set to operate selectively in either a handshaking or a streaming mode of operation. In the handshaking mode, the data transfer driver transmits data bytes to the peripheral device asynchronously, monitoring handshaking signals from the peripheral device and refraining from transmitting each data byte until the peripheral device indicates that it is ready to accept it. In the streaming mode, the data transfer driver transmits data bytes to the peripheral device at regular intervals and ignores handshaking signals from the peripheral device.

It is accordingly an object of the invention to provide an improved driver for receiving multiple byte data words from a data processing device and for retransmitting them to a peripheral device in the form of sequences of single data bytes.

It is another object of the invention to provide an improved data transfer driver for transferring data from a data processing device to a peripheral device which permits the data processing device to test operation of the driver and to monitor the handshaking signals produced by the peripheral device.

It is a further object of the invention to provide an improved data transfer driver for transferring data from a data processing device to a peripheral device selectively in either handshaking or streaming modes.

The subject matter of the present invention is particularly pointed out and distinctly claimed in the concluding portion of this specification. However, both the organization and method of operation of the invention, together with further advantages and objects thereof, may best be understood by reference to the following description taken in connection with accompanying drawings wherein like reference characters refer to like elements.

DESCRIPTION OF THE PREFERRED EMBODIMENT

Figure 1:
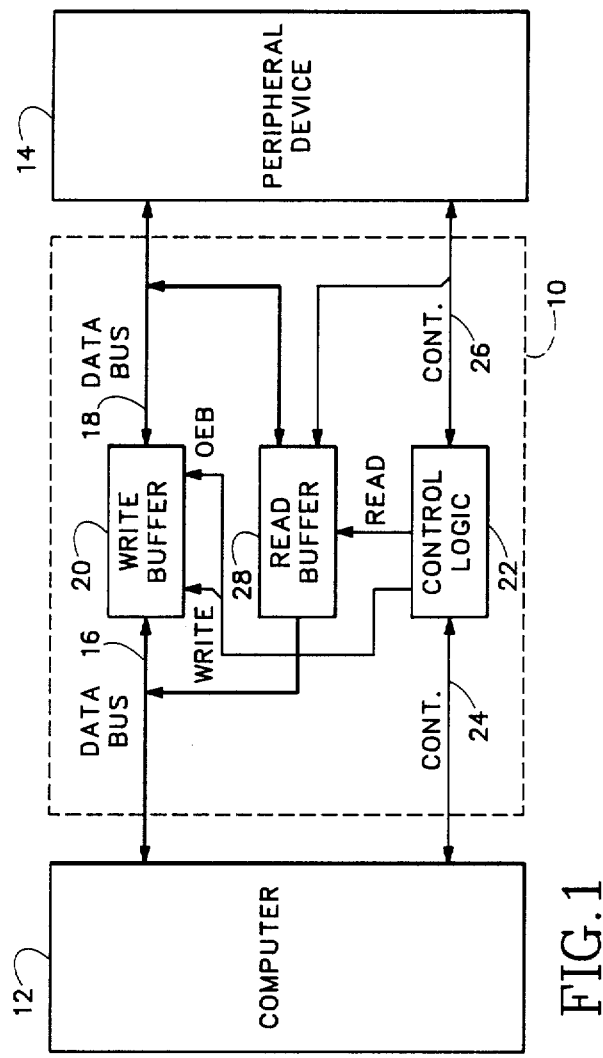
FIG. 1 is a block diagram showing a computer and a peripheral device interconnected by a data transfer driver in accordance with the present invention.

With reference to FIG. 1, a data transfer driver 10 in accordance with the present invention is adapted to convey output data produced by a data processing device such as a computer 12 as input data to a peripheral device 14 such as a printer. Computer 12, suitably comprising a Motorola model 68020 microprocessor, produces its output data in the form of a 32-bit (four byte)

parallel data word on a first data bus 16 of data transfer driver 10. Peripheral device 14 receives its input data in the form of a sequence of 8-bit data bytes on a second data bus 18. Data transfer driver 10 includes a write buffer 20 for receiving the four-byte data word conveyed on bus 16 from computer 12 and for sequentially retransmitting data bytes in that word to peripheral device 14 via bus 18. Data transfer driver 10 also includes a control logic circuit 22 for producing a WRITE signal controlling data reception and a set of output enable signals OEB for controlling retransmission of each byte by write buffer 20. Control logic circuit 22 communicates with computer 12 and peripheral device 14 via handshaking control signals 24 and 26, respectively, so as to coordinate asynchronous data transmission from computer 12 to write buffer 20 and from write buffer 20 to peripheral device 14. To transfer data to peripheral device 14, computer 12 transfers a 32-bit data word to driver 10. Driver 10 then auto transfers the data word to peripheral device 14 on a byte-by-byte basis without further intervention by computer 12, thereby freeing computer 12 to carry out other operations during the data transfer.

Data transfer driver 10 also includes a read buffer 28 that receives each data byte transmitted on bus 18 as well as the handshaking control signals 26 transmitted from peripheral device 14 to control logic circuit 22. To test operation of data transfer driver 10, or to check the states of handshaking signals produced by peripheral device 14, computer 12 may request control logic circuit 22 via control signals 24 to output enable read buffer 28 via a READ control signal. When read buffer 28 is output enabled, its input data byte and control signals are placed on data bus 16 for transmission back to computer 12. When testing operation of driver 10 computer 12 may transmit a data word to write buffer 20 and then read via read buffer 28 each data byte subsequently transferred from write buffer 20 to peripheral device 14. The computer can also monitor the states of handshaking signals produced by the peripheral device to ensure that it is working properly. Such tests can be carried out automatically during start-up of computer 12 without need for human intervention.

Figure 2:
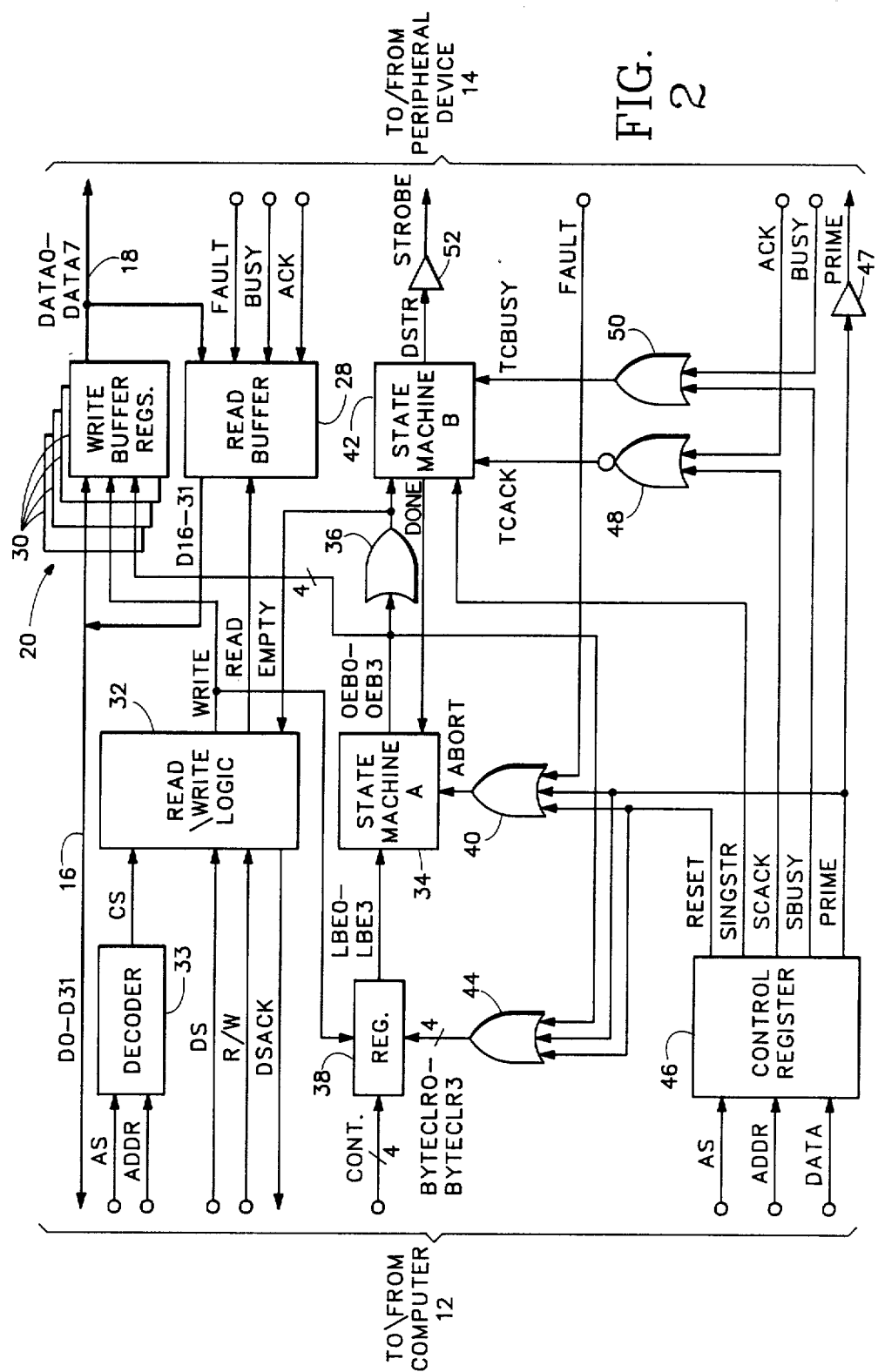
FIG. 2 is a more detailed block diagram of the data transfer driver of FIG. 1.

Data transfer driver 10 of FIG. 1 is shown in more detailed block diagram form in FIG. 2. With reference to FIG. 2, the bits of the 32-bit (four byte) data word on bus 16 connecting computer 12 to write buffer 20 are labeled from D0 to D31. A first data byte (Byte 0) thereof includes bits D24–D31, a second data byte (Byte 1) includes data bits D16–D23, a third data byte (Byte 2) includes data bits D8–D15, and a fourth data byte (Byte 3) includes data bits D0–D7. Write buffer 20 comprises a set of 8-bit registers 30, each having as input a separate one of the 8-bit bytes of the 32-bit data word on bus 16. The 8-bit output of each register 30 of write buffer 20 is connected to the 8-bit data bus 18 between peripheral device 14 and write buffer 20. Each write buffer register 30 is input enabled by a common WRITE signal produced by a read/write logic circuit 32 and is output enabled by a separate output enable signal OEB0–OEB3 produced by a state machine 34, hereinafter referred to as "state machine A". Since only one output enable signal OEB0-3 is asserted at a time, the data byte stored in only one of the write buffer registers 30 is placed on bus 18 at any given time.

Read buffer 28 receives a data byte on data bus 18 from the currently output enabled write buffer register 30 and also receives three binary handshaking control signals (FAULT, BUSY, and ACK) from peripheral device 14. Read buffer 28 passes its input data byte and the control signals to computer 12 in bits D16–31 on data bus 18 when output enabled by a signal produced by read/write logic circuit 32.

Read/write logic circuit 32 receives a chip select signal CS produced by a decoder 33 in response to an address signal ADDR and an address strobe signal AS from computer 12. Read/write circuit 32 also receives a data strobe signal DS, and a read/write control signal R/W from computer 12 and receives a low true "EMPTY" output signal of an OR gate 36 having output enable signals OEB0–OEB1 produced by state machine A as its inputs. Read/write logic circuit 32 produces in response to logical combinations of its input signals the READ signal output enabling read buffer 28, the WRITE signal input enabling write buffer registers 30, and a handshaking signal DSACK transmitted to computer 12. Read/write logic circuit 32 implements the following Boolean expressions:

WRITE = CS*DS* − R/W*EMPTY
READ = CS*R/W
DSACK = CS* − R/W*EMPTY

In the above expressions the "*" signal represents the logical AND function and the "−" symbol represents the logical NOT function.

State machine A is suitably clocked by a 5 MHz clock signal (not shown) from computer 12 so that state changes occur at 200 nanosecond intervals. State machine A has as its inputs a set of four data bits LBE0–LBE3 stored in a set of four single bit registers 38 (only one register 38 is shown), an ABORT signal produced by an OR gate 40, and a DONE signal produced by another state machine 42, hereinafter referred to as "state machine B". Each register 38 has as input a separate single bit control signal produced by computer 12 and is input enabled by the WRITE signal output of read/write logic circuit 32. Each register 38 is reset by a separate one of four byte clear signals BYTECLR0–BYTECLR3 produced by a set of four OR gates 44 (only one OR gate 44 is shown). Each OR gate 40 has as its inputs a RESET and a PRIME signal provided by a control register 46, and a FAULT signal provided by peripheral device 14. Each OR gate 44 has as inputs the RESET and PRIME signals produced by control register 46 and a separate one of the output enable signals OEB0–OEB3 produced by state machine A.

The output signal EMPTY of OR gate 36 and an output signal SINGSTR of control register 46 are also supplied as inputs to state machine B. A low true acknowledge signal SCACK produced by control register 46 and a low true acknowledge signal ACK provided by peripheral device 14 are supplied as inputs to a NOR gate 48, and a high true output signal TCACK produced by NOR gate 48 is supplied as another input to state machine B. A high true output signal SBUSY of control register 46 and high true busy signal output BUSY of peripheral device 14 are supplied as inputs to another OR gate 50 which produces a high true output signal TCBUSY, also provided as input to state machine B. State machine B produces the output signal DONE supplied to state machine A and also produces a low true output signal DSTR which is buffered by a buffer 52 and supplied as a low true STROBE signal to peripheral device 14.

Control register 46 is write enabled by the address strobe AS from computer 12 when the address on the address bus ADDR is a predetermined value. When write enabled, control register 46 stores data from computer 12, thereby to set the states of the RESET, SINGSTR, SCACK, SBUSY and PRIME output signals of the control register. The peripheral device is input enabled to receive a data byte on bus 18 when state machine B causes buffer 52 to assert the STROBE signal input to peripheral device 14. The peripheral device 14 asserts the BUSY signal when it is not ready to receive data by via bus 18, and asserts (drives low) the acknowledge signal ACK after it has received a data byte and continues to assert the ACK signal until such time as it is prepared to receive a next byte. The peripheral device may assert the FAULT signal when it detects an error in its operation.

Data transfer driver 10 can transfer bytes to peripheral device 14 utilizing either a "handshaking" or a "streaming" mode of operation. In the handshaking mode, driver 10 monitors the BUSY and ACK signals produced by the peripheral device and refrains from asserting the STROBE signal when either the BUSY or ACK signals are asserted so as to avoid sending data to the peripheral device faster than it can accept it. In the streaming mode, driver 10 ignores the BUSY and ACK signals and sends data bytes to the peripheral device at regular intervals.

To transfer data to peripheral device 14 utilizing the handshaking mode of data transfer, computer 12 first sets the states of the bits in control register 46 so that SCACK, SBUSY, RESET, and PRIME are false, and so that SINGSTR is true. A true SINGSTR signal indicates to peripheral device 14 that it is to implement the handshaking mode of operation. Computer 12 then sets the appropriate address on the address bus ADDR, sets the R/W signal input to read/write logic circuit 32 low, and then causes decoder 33 to assert the CS signal. Logic circuit 32 responds by asserting its READ output signal, thereby output enabling read buffer 28. When read buffer 28 thereupon places the FAULT, BUSY and ACK signal outputs of peripheral device 14 on the data bus 16, computer 12 reads the state of the BUSY, FAULT and ACK signals to ensure that the peripheral device is ready to accept data.

If the peripheral device is ready, computer 12 asserts the four control signals at the inputs to registers 38, places a 32-bit data word on bus 16, and then signals decoder 33 to initiate the CS signal once again, thereby to cause read/write logic circuit 32 to assert the WRITE signal and to assert the DSACK signal to computer 12. However, the read/write logic circuit will do so only if the EMPTY signal is true. OR gate 36 sets the EMPTY signal true (low) when all of the write enable signals OEB0–OEB3 are low, indicating that no data byte store write buffer register 30 is awaiting transmission to peripheral device 14. If the EMPTY signal is false, logic circuit 32 does not assert the WRITE signal or the DSACK signal. If computer 12 does not detect the DSACK signal, it determines that the write buffer registers 30 are not ready to accept data and continues to attempt to cause read/write logic circuit 32 to input enable the write buffer registers 30 until assertion of the WRITE signal is evidenced by an asserted DSACK signal.

The WRITE signal causes write buffer registers 30 to store the four data bytes on data bus 16 and also causes registers 38 to store and output the states of the input data bits provided by computer 12. These four bits LBE0–LBE3 indicate which of the four bytes stored in write buffer registers 30 are to be retransmitted to peripheral device 14. For example, if only bit LBE0 is true, then only BYTE 0 is to be retransmitted, if bits LBE0 and LBE1 are true then byte 0 and byte 1 are to be retransmitted, if bits LBE0, LBE1 and LBE2 are true then bytes 0, 1 and 2 are to be retransmitted, and if all bits LBE0–LBE3 are true then all bytes 0–3 are to be retransmitted.

State machine A monitors the states of bits LBE0–LBE3, and if one or more of the bits is true, it begins to sequentially assert the output enable signals OEB0–OEB3 signals corresponding to the asserted LBE0–LBE3 bits so that the particular write buffer registers 30 containing a byte to be transmitted to peripheral device 14 are sequentially output enabled. For example, if LBE0–LBE3 are all true, state machine A first asserts OEB0. The OEB0 signal is provided to one of the OR gates 44, the BYTECLR0 output of which sets to false the state of the LBE0 bit stored in one of registers 38. The OEB0 signal also output enables a first write buffer register 30 so that data byte 0 is placed on bus 18. In addition, the OEB0 signal causes OR gate 36 to set the EMPTY signal false.

State machine B monitors the EMPTY and TCBUSY signals, and when both signals are false, state machine B asserts its DSTR output signal (i.e. drives it low) causing buffer 52 to assert (drive low) the STROBE signal to peripheral device 14. STROBE signal assertion causes peripheral device 14 to read data byte 0 on bus 18 and to assert the BUSY signal. Thereafter, it asserts and then deasserts the ACK signal, and then deasserts the BUSY signal when it is ready to read another data byte. Assertion and deassertion of the ACK and BUSY signals, causes NOR gate 48 and OR gate 50 to assert and deassert the TCACK and TCBUSY signals. When state machine B determines that the TCACK and TCBUSY signals have been deasserted, it transmits the DONE signal to state machine A.

On detection of the DONE signal, state machine A deasserts the OEB0 signal and asserts the OBE1 signal, thereby causing one of write buffer registers 30 to place data byte 1 on bus 18 and causing, by way of one of OR gates 44, one of registers 38 to set LBE1 false. State machine B thereafter reasserts the STROBE signal, causing the peripheral device 14 to read the data byte 1 on bus 18, and then reasserts the DONE signal. As the process continues state machine A subsequently asserts OEB2 and the OEB3 to cause write buffer registers 30 to place data byte 2 and then data byte 3 on bus 18 while state machine B asserts the STROBE signal two more times so that peripheral device 14 sequentially reads the last two data bytes. When all of the data bytes have been transferred, output enable signals OEB0–OEB3 are all low and the EMPTY signal output of OR gate 36 is true. Thus when computer 12 next attempts to write access the write buffer, read/write logic circuit 32 will assert the DSACK signal to indicate completion of the write access.

When computer 12 seeks to transfer data to peripheral device 14 utilizing the streaming mode, it follows the same procedure described hereinabove for the handshaking mode except that when initially loading data into control register 46, it sets the SINGSTR bit low, thereby telling state machine B that it is to utilize the streaming mode. When operating in the streaming mode, state machine B ignores its TACK and TCBUSY inputs and asserts its DSTR and DONE output signals periodically as long as the EMPTY signal remains false. Thus, peripheral device 14 is sent data periodically rather than as a result of asynchronous handshaking protocol. The streaming mode enables more rapid transfer of data to peripheral device 14 than the handshaking mode.

Computer 12 can reset operation of data transfer driver 10 to an initial state by temporarily setting the RESET or the PRIME bit in control register 46 true. This causes OR gate 40 to transmit an ABORT signal to state machine A, causing the state machine to assume an initial state. The FAULT signal from peripheral device 14 also initiates the ABORT signal to reset state machine A. The RESET and PRIME signals also cause OR gates 44 to assert the BYTECLR0-BYTECLR3 signals, thereby setting LBE0-LBE3 false. When state machine A goes to its initial state, it sets OEB0-OEB3 low, thereby causing OR gate 36 to set the EMPTY signal true. On detection of a true EMPTY signal, state machine B returns to its initial state wherein it asserts the DONE signal and waits until the EMPTY signal goes false. The PRIME signal is also transmitted to peripheral device 14 via a buffer 47 and may be used for resetting operation of the peripheral device.

Figure 3:
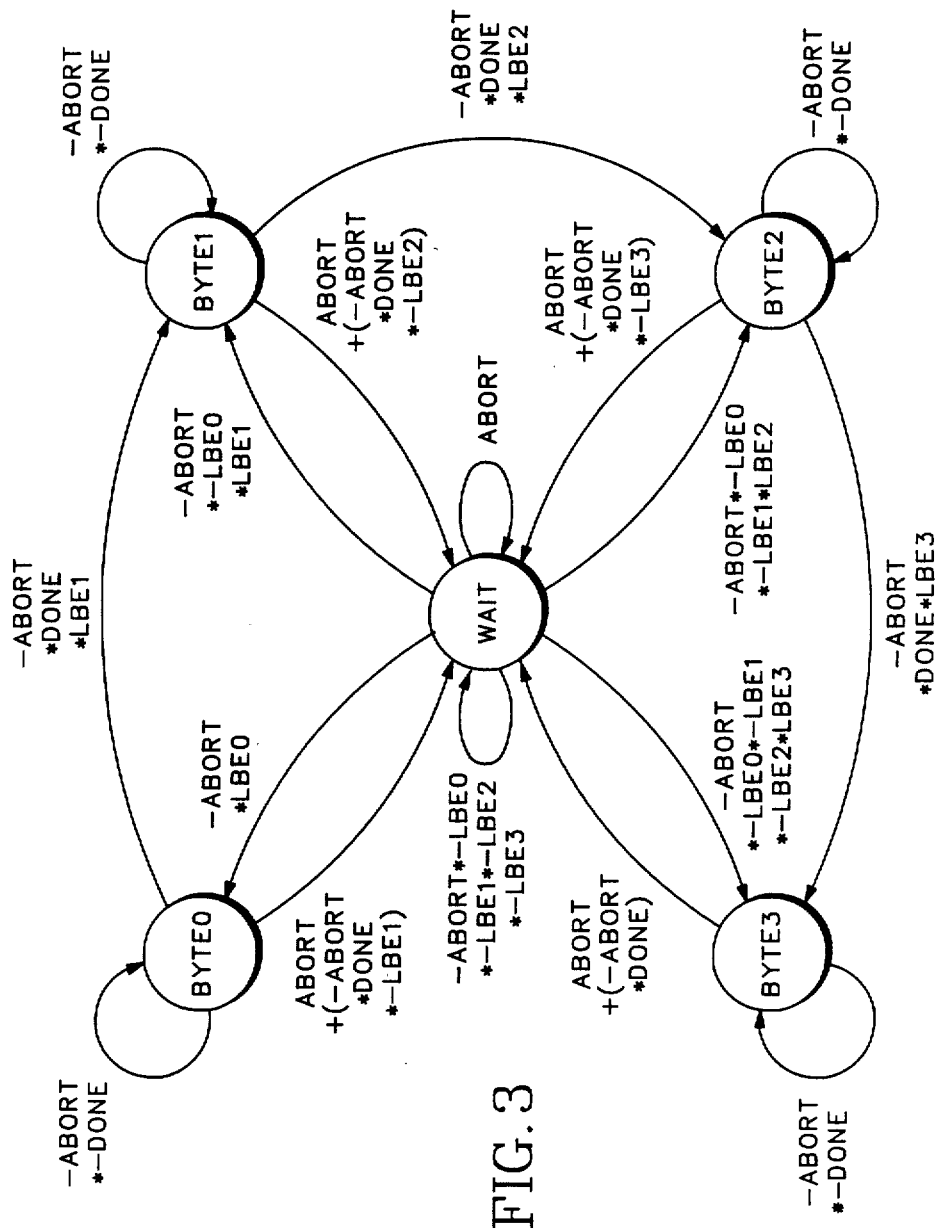
FIG. 3 is a state diagram illustrating operation of state machine A of FIG. 2.

FIG. 3 is a state diagram illustrating operation of state machine A where the "*" symbol represents the AND function, the "+" symbol represents the OR function, and the "—" symbol represents the NOT function. When the ABORT signal is asserted, state machine A enters a WAIT state regardless of what state it may currently be in. In the WAIT state, the LBE0-LBE3, signals are all deasserted. The state machine remains in the WAIT state until the ABORT signal is deasserted and until at least one of the LBE0-LBE3 bits are true. If LBE0 is true, a BYTE0 state is entered. If LBE0 is false but LBE1 is true, a BYTE1 state is entered. If LBE0 and LBE1 are false and LBE2 is true a BYTE2 state is entered. If LBE0, LBE1, and LBE2 are false but LBE3 is true a BYTE3 state is entered.

In the BYTE0 state, state machine A asserts the OEB0 signal. Similarly in the BYTE1-BYTE3 states the state machine asserts the corresponding OEB1-OEB3 signal. In the BYTE0 state, when the DONE signal 1 is detected, the WAIT state is re-entered, provided that LBE1 is not true. If LBE1 is true, the BYTE1 state is entered. The WAIT state is re-entered from the BYTE1 state on detection of DONE and not LBE2. If LBE2 is true, state machine A switches from the BYTE1 to the BYTE2 state. In the BYTE2 state, when the DONE signal is detected, the WAIT state is re-entered if LBE3 is not true. If LBE3 is true the BYTE3 state is entered. State machine A switches from the BYTE3 state to the WAIT state on detection of the DONE signal.

Figure 4:
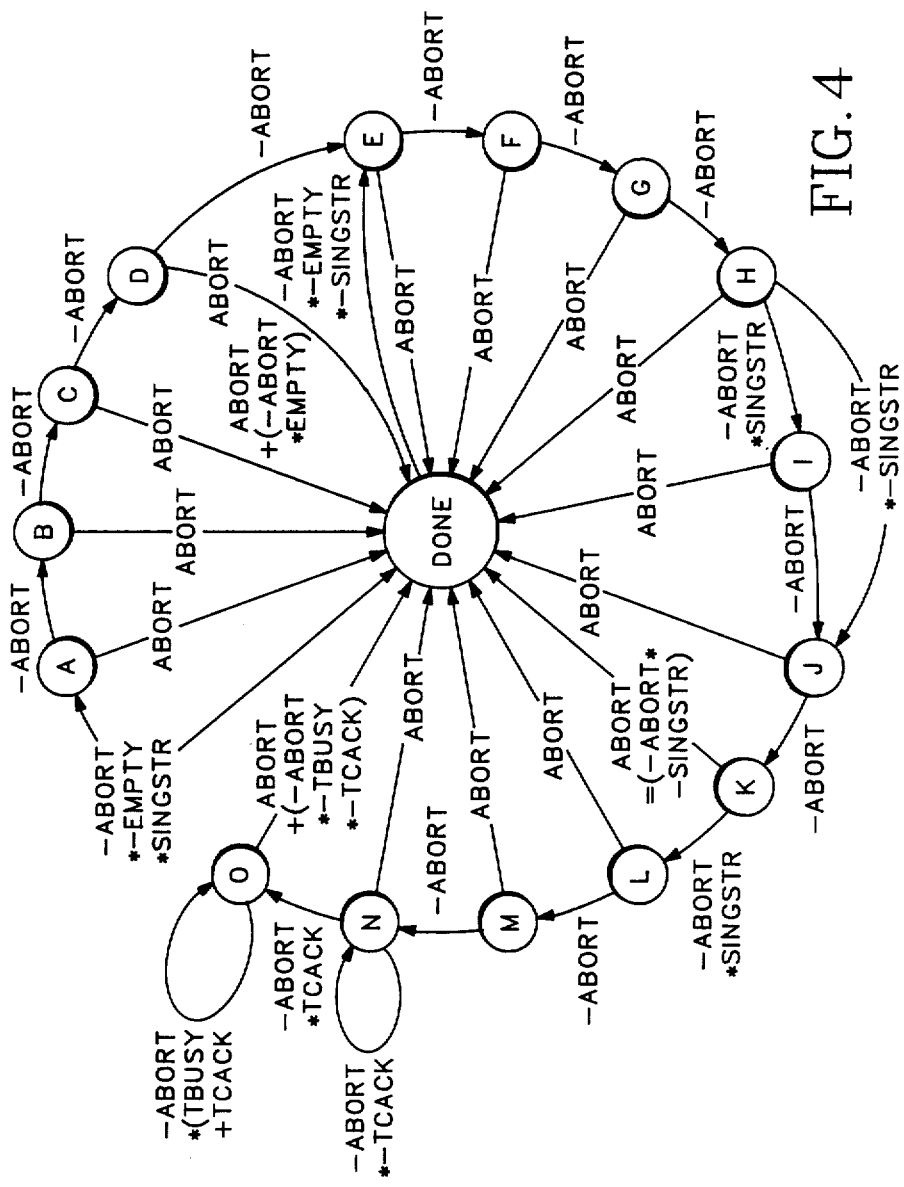
FIG. 4 is a state diagram illustrating operation of state machine B of FIG. 2.

FIG. 4 is a state diagram illustrating operation of state machine B. State machine B has 16 states including a DONE state and states A-0. The DONE signal is asserted only in the DONE state and the DSTR signal is asserted only in states F through J. The DONE state is entered from all other states when the ABORT signal is asserted. In the handshaking mode, when the SINGSTR signal is true, the machine switches from the DONE state to state A when the EMPTY signal is set false. The state machine then steps through states A-E in sequence to provide a time delay of predetermined length following after the EMPTY signal goes false, and then switches to state F where the DSTR signal is asserted. The state machine steps through states G-J while continuing to assert the DSTR signal. and then in step K it deasserts the DSTR signal. From state K, the machine steps through states L, M and N, and then remains in state N until it detects assertion of the TCACK signal. Thereafter, the state machine moves to state 0 and waits therein until it detects deassertion of both TCBUSY and TCACK. At that point the machine moves to the DONE state and reasserts the DONE signal.

In the streaming mode, the SINGSTR signal is false, and the state machine jumps from the DONE state directly to the E state when the EMPTY signal goes false, thus reducing the delay in assertion of the DSTR signal. The state machine thereafter moves through states F, G and H, and then skips to state J. The DSTR signal is asserted in states F, G, H and J, the period during which DSTR is asserted being reduced by skipping state I. The state machine moves from state J to state K where the DSTR signal is deasserted, and then directly to the DONE state where the DONE signal is asserted. States L-O are bypassed, thereby allowing the state machine to ignore the TCBUSY and TCACK signal and to substantially shorten the period between deasserting the DSTR signal and asserting the DONE signal.

Figure 5:
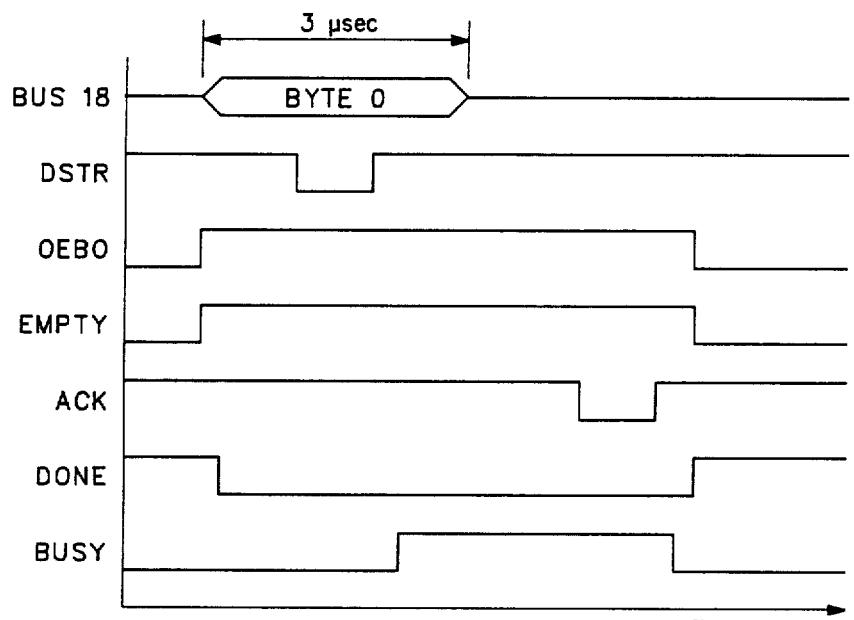
FIG. 5 is a diagram illustrating signal timing when the data transfer driver of FIG. 2 is operating in a handshaking mode.

FIG. 5 illustrates signal timing when the data transfer driver is operating in the handshake mode and only Byte 0 is transferred from a write buffer register to the peripheral device. The EMPTY signal is deasserted (driven high) when state machine A drives the enable signal OEB0 high, and shortly thereafter a valid byte 0 appears on bus 18 to the peripheral device. Shortly after the EMPTY signal is deasserted, state machine B drives the DONE signal low, and after a delay of 1 microsecond following deassertion of the EMPTY signal, state machine B drives the DSTR strobe signal low for 1 microsecond, thereby causing the peripheral device to read byte 0. The peripheral device then asserts the BUSY signal until it is ready to accept another data byte. In the meantime, the peripheral device toggles the ACK signal. When the BUSY signal eventually goes low, state machine B asserts the DONE signal. In the handshaking mode, byte 0 is valid on bus 18 for 3 microseconds, but the total time required to complete the date transfer depends on the speed with which the peripheral device can respond to the STROBE signal.

Figure 6:
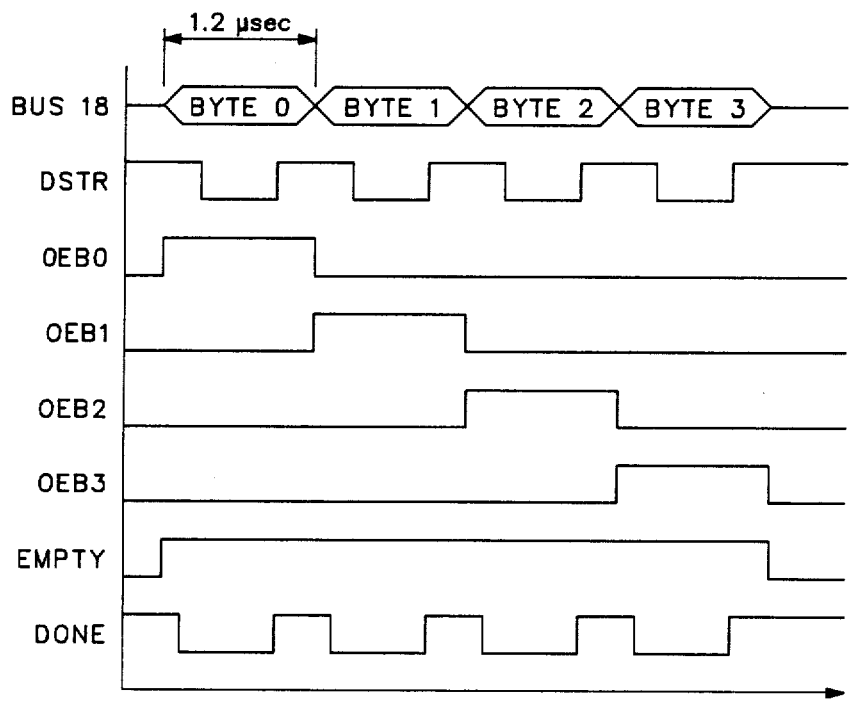
FIG. 6 is a diagram illustrating signal timing when the data transfer driver of FIG. 2 is operating in a streaming mode.

FIG. 6 is a timing diagram illustrating signal timing when the data transfer driver is operating in the streaming mode. State machine A drives the OEB0 signal high to enable byte 0 onto bus 18, and the OEB0 signal drives the EMPTY signal high. State machine B drives the DONE signal and DSTR signals low 200 nanoseconds later. After another delay of 800 nanoseconds state machine B drives DSTR high again, and 200 nanoseconds thereafter drives DONE high again. On detection of the high DONE signal, state machine A deasserts the OEB0 signal and asserts the OEB1 signal. The process continues with state machine successively asserting the OEB1-3 signals while state machine B asserts the DSTR and DONE signals so that bytes 1-3 are placed on bus 18 and strobed into the peripheral device at 1.2 millisecond intervals. When at last OEB3 is deasserted, the EMPTY signal is driven low.

A data transfer driver has been shown and described that transfers multiple byte data words supplied by a data processing device such as a computer to a peripheral device in the form of a sequence of single data bytes. The driver is adapted to operate selectively in either a handshaking mode, wherein data bytes are transferred to the peripheral device asynchronously in response to handshaking signals from the peripheral device, or in a streaming mode, wherein data bytes are transferred to the peripheral device periodically without handshaking. Finally, the driver includes circuitry, including the read register, that permits the data processing device to check the operation of the driver and to monitor the handshaking signals produced by the peripheral device.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A data transfer driver for transferring data between a data processing device and a peripheral device comprising:

write buffer means for receiving a parallel data word comprising a plurality of parallel data bytes transmitted thereto by said data processing device, wherein each of said parallel data bytes comprises a plurality of bits, and for separately transmitting each of said plurality of parallel data bytes to said peripheral device at successive times, reception of said data word and transmission of each of said data bytes by said write buffer means being controlled by write buffer control signals applied as input to said write buffer means; and control means for receiving a first handshaking signal from said data processing device indicating when said data processing device has transmitted said parallel data word to said write buffer means, a second handshaking signal from said peripheral device indicating when said peripheral device is ready to receive a data byte, and a mode selection control signal initiated by said data processing device, said control means operating selectively in one of handshaking and streaming modes in accordance with said mode selection control signal, such that when operating in said handshaking mode said control means generates in response to said first handshaking signal said write buffer control signals to cause said write buffer means to receive said parallel data word after said data processing device has transmitted said data word and to cause said write buffer means to transmit said data bytes in sequence to said peripheral device only when said second handshaking signal indicates said peripheral device is ready to receive a data byte, and such that when operating in said streaming mode said control means generates said write buffer control signals to cause said write buffer means to periodically transmit data bytes to said peripheral device regardless of whether said second handshaking signal indicates said peripheral device is ready to receive a data byte.

2. The data transfer driver in accordance with claim 1 wherein said control means includes means for transmitting an acknowledge signal to said data processing device to indicate to said data processing device when said write buffer means has received said parallel data word.

3. The data transfer driver in accordance with claim 1 wherein said write buffer control signals comprise an input enable signal and a plurality of output enable signals, one output enable signal corresponding to each of said plurality of data bytes, and wherein said write buffer means comprises a plurality of write buffer register means, each write buffer register means responsive to said input enable signal and a corresponding one of said output enable signals, each write buffer register means being connected to said data processing means for receiving and storing a separate one of said plurality of data bytes of said data word in response to said input enable signal, and each write buffer register means being connected to said peripheral device for transmitting its stored data byte to said peripheral device in response to its corresponding the output enable signal.

4. A data transfer driver for transferring data between a data processing device and a peripheral device comprising:

a first data bus for carrying a parallel data word generated and placed thereon by said data processing device, said data word comprising a plurality of parallel data bytes, wherein each of said data bytes comprises a plurality of bits;

a second data bus for carrying a single parallel data byte to said peripheral device;

a plurality of write buffer register means for storing data bytes, each connected to said first and said second data bus, each input enabled by a write signal, each output enabled by a separate corresponding output enable signal, each receiving and storing a separate one of said plurality of data bytes of said parallel data word carried on said first data bus when said write signal is asserted and each transmitting its stored data byte to said peripheral device by way of said second data bus when its corresponding output enable signal is asserted;

means for receiving a first handshaking signal from said data processing device indicating when said data processing device has placed said parallel data word on said first data bus and for generating in response to said first handshaking signal said write signal to input enable each said write buffer register means so that each write buffer register means receives and stores a separate data byte of said parallel data word; and control means for receiving a second handshaking signal from said peripheral device indicating when said peripheral device is ready to receive a data byte, for receiving a third signal from said data processing device indicating selected ones of said plurality of data bytes stored in said write buffer register means to be transmitted to said peripheral device, for sequentially asserting in response to said second handshaking signal the output enable signal corresponding to each of said write buffer register means storing said selected ones of said plurality of data bytes so that said write buffer register means sequentially transmits said selected ones of data bytes to said peripheral device by way of said second bus, and for transmitting a fourth handshaking signal to said peripheral device to indicate whenever one of said selected ones of data bytes is transmitted thereto.

5. The data transfer diver in accordance with claim 4 wherein said data transfer driver further comprises read buffer means for transmitting a data byte conveyed on said second bus to said data processing device.

6. The data transfer diver in accordance with claim 5 wherein said read buffer means also receives and retransmits said second handshaking signal from said peripheral device to said data processing device.

7. A data transfer driver for transferring data between a data processing device and a peripheral device comprising:
- a first data bus for carrying a data word placed thereon by said data processing device, said data word comprising a plurality of parallel data bytes and for carrying data to said data processing device, wherein each of said data bytes comprises a plurality of bits;
- a second data bus for carrying a single parallel data byte to said peripheral device;
- write buffer means responsive to a write signal and a plurality of output enable signals, one output enable signal corresponding to each of said plurality of data bytes, for receiving and storing said data word carried on said first data bus in response to assertion of said write signal, and for placing each byte of said stored data word on said second data bus in response to assertion of the corresponding output enable signal;
- read buffer means responsive to a read signal for receiving each data byte carried on said second data bus and for placing said data byte on said first bus for transmission to said data processing device when said read signal is asserted;
- means for receiving first handshaking signals from said data processing device indicating when said data processing device has placed said parallel data word on said first data bus and indicating when said read buffer means is to place said data byte carried on said second bus on said first bus, and for asserting said write and read signals in response to said first handshaking signals; and
- control means for sequentially asserting said output enable signals so that said write buffer means sequentially transmits its stored data bytes to said peripheral device and said read buffer means by way of said second bus.

* * * * *